(12) United States Patent
Cochran

(10) Patent No.: US 11,473,309 B1
(45) Date of Patent: Oct. 18, 2022

(54) DOWNSPOUT END COVER HAVING PROTECTION FROM ANIMAL/INSECT INTRUSION AND DAMAGE/DEBRIS ACCUMULATION

(71) Applicant: Stephen Cochran, Winder, GA (US)

(72) Inventor: Stephen Cochran, Winder, GA (US)

(*) Notice: Subject to any disclaimer, the term of this patent is extended or adjusted under 35 U.S.C. 154(b) by 0 days.

(21) Appl. No.: 17/323,873

(22) Filed: May 18, 2021

Related U.S. Application Data

(60) Provisional application No. 63/179,040, filed on Apr. 23, 2021.

(51) Int. Cl.
  *E04D 13/08* (2006.01)
  *A01M 29/30* (2011.01)

(52) U.S. Cl.
  CPC ............ *E04D 13/08* (2013.01); *A01M 29/30* (2013.01); *E04D 2013/0806* (2013.01)

(58) Field of Classification Search
  CPC . E04D 13/08; E04D 2013/0806; A01M 29/30
  See application file for complete search history.

(56) References Cited

U.S. PATENT DOCUMENTS

| | | | |
|---|---|---|---|
| 233,853 A | 11/1880 | Heafer | |
| 906,562 A | 12/1908 | Rue et al. | |
| 929,514 A * | 7/1909 | Tenold | B01D 35/147 |
| | | | 137/527.6 |
| 2,927,596 A * | 3/1960 | Carlson | E02B 13/02 |
| | | | 137/151 |
| 4,174,913 A | 11/1979 | Schliesser | |
| 4,356,087 A | 10/1982 | Miles | |
| D301,164 S * | 5/1989 | Weaver | 52/16 |
| 5,348,138 A * | 9/1994 | Seemann | B65G 33/24 |
| | | | 49/58 |
| 6,474,365 B1 | 11/2002 | Brown et al. | |
| 7,240,378 B2 * | 7/2007 | Long | F16K 15/035 |
| | | | 137/527 |
| D882,045 S | 4/2020 | Cochran | |
| 10,617,113 B2 * | 4/2020 | Robinson | A01M 29/30 |
| 2005/0092372 A1 * | 5/2005 | Wade | F16K 15/03 |
| | | | 137/527.6 |
| 2007/0012365 A1 * | 1/2007 | Kishi | F16K 15/033 |
| | | | 137/527 |
| 2018/0016792 A1 * | 1/2018 | Valdez | F16L 37/02 |

\* cited by examiner

*Primary Examiner* — Adriana Figueroa
(74) *Attorney, Agent, or Firm* — Mitch Harris, Atty at Law, LLC; Andrew M. Harris

(57) ABSTRACT

A downspout end cover protects and closes a lower end of a rain gutter downspout assembly. The cover includes a body that forms a continuous hollow channel with the top and the bottom for passage of collected rainwater. The back of the body forms a first aperture sized to attach to an end of the downspout and the front forms a second aperture that emits collected rainwater. A door is rotatably attached to the front of the body at a top of the front of the body by a hinge and when closed, prevents entry of animals, insects or blown debris. A ledge provided behind the door, so that the door, when closed, rests against the ledge and does not protrude from the body, protecting the door and sealing the downspout end cover against entry of insects and preventing detachment of the door from the body.

13 Claims, 11 Drawing Sheets

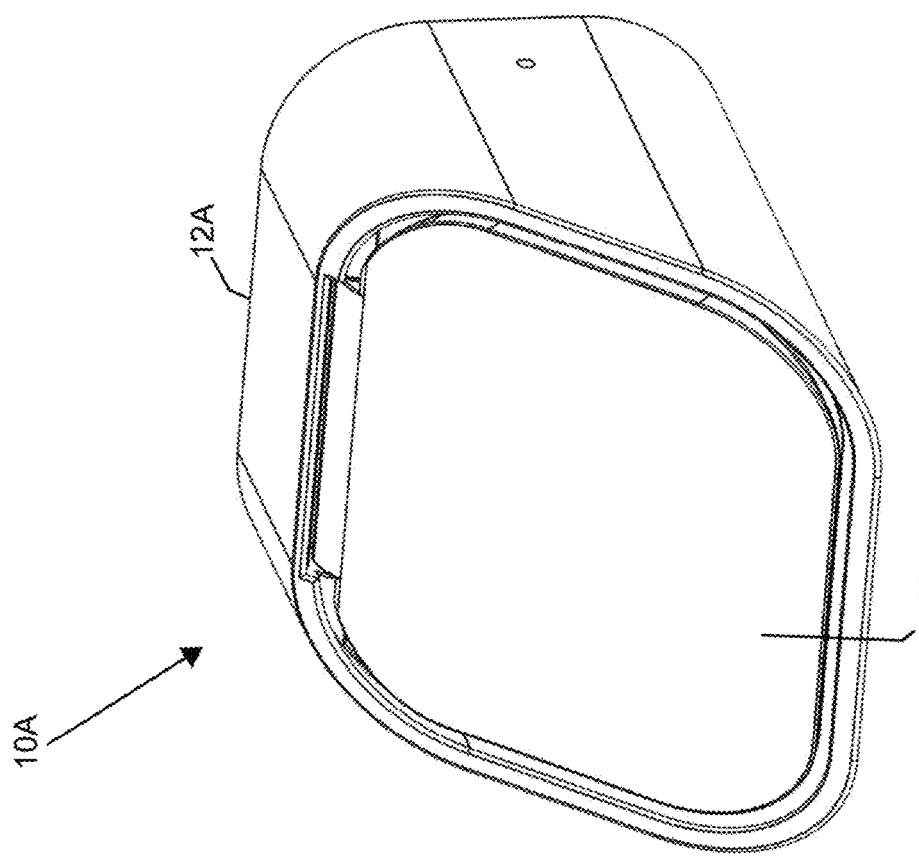
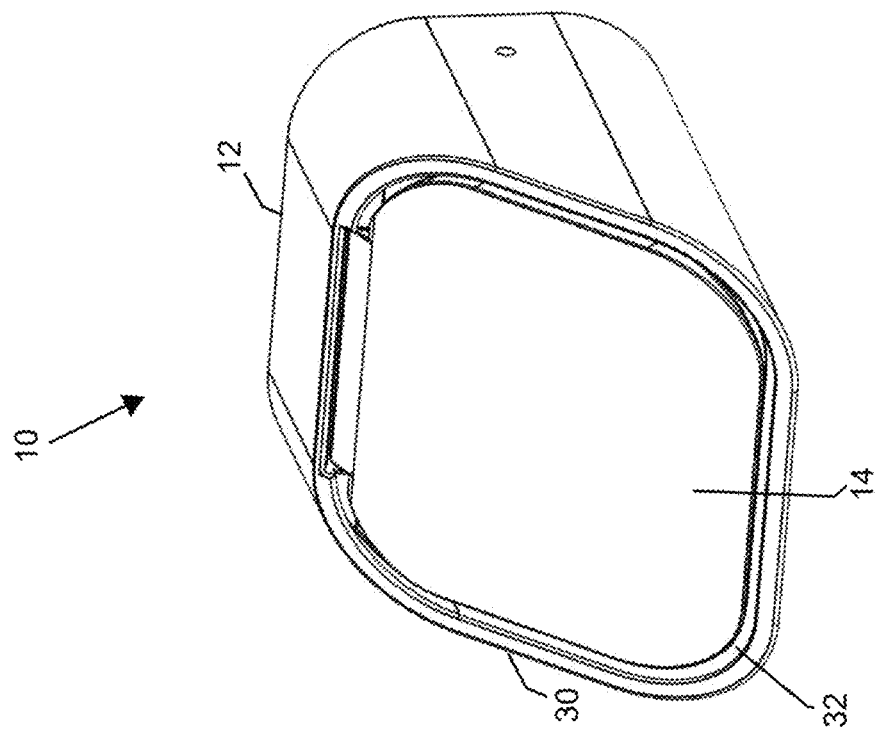

DOWNSPOUT END COVER HAVING PROTECTION FROM ANIMAL/INSECT INTRUSION AND DAMAGE/DEBRIS ACCUMULATION

BACKGROUND OF THE INVENTION

1. Field of the Invention

The present invention relates generally to rainwater gutter systems, and in particular, to a cover for a downspout end that incorporates protection from animal/insect intrusion and damage/debris accumulation.

2. Description of the Related Art

In order to keep pests and small animals out of rainwater gutter systems, downspout end covers, such as the one disclosed in U.S. Design Patents D301,164 and D882,045 have been implemented to close the bottom end of downspouts in rainwater gutter systems.

However, such downspout end covers are susceptible to damage by powered landscape maintenance tools such as string trimmers or leaf blowers, which can cause doors to be detached from the downspout end covers or damage to the doors or cover housings so that the door will not close or open properly. Additionally, such doors typically are not proof from intrusion by insects. Finally, debris, which may be scattered by lawnmowers, string trimmers and leaf blowers can cause the doors not to function properly.

Therefore, it would be desirable to provide a downspout end cover with reduced susceptibility to damage from line trimmers, while preventing animal and insect intrusion, and also preventing debris accumulation.

SUMMARY OF THE INVENTION

The above objectives, among others, are achieved in a downspout end cover, rainwater gutter downspout systems including the downspout end cover, and a method of assembling the downspout end cover.

The downspout end cover protects and closes a lower end of a rain gutter downspout assembly, and includes a body having a top, a bottom extending parallel to the top and a pair of parallel sides. The sides extend perpendicular to and are contiguous with the top and the bottom and form a continuous hollow channel with the top and the bottom for passage of collected rainwater, and a back of the body forms a first aperture sized to fit a cross-section profile of an end of the downspout. The front of the body forms a second aperture to permit exit of collected rainwater. A door is rotatably attached to the front of the body at a top of the front of the body by a hinge, so that in a closed position, the door prevents entry of insects or blown debris and opens under a force of weight from the collected rainwater to permit exit of the collected rainwater. An inner ledge is formed on an inner surface of the body at front of the body and forms an extension into the channel in a direction parallel to the door when the doors is in the closed position. The inner ledge is inset from a front edge of the second aperture by at least a thickness of the door, so that the door rests against the inner ledge when the door is in the closed position to seal the downspout end cover against entry of insects and the door is recessed within the second aperture to protect the door from being damaged or detached from the body.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 6A is a front upper right perspective view of an example downspout cover 10 in accordance with an embodiment of the disclosure.

FIG. 6B is a front upper right perspective view of an example downspout cover 10A in accordance with another embodiment of the disclosure.

DESCRIPTION OF ILLUSTRATIVE EMBODIMENT

The present disclosure illustrates rainwater guttering systems with downspout end covers that have improved resistance to damage and animal/insect incursion. The downspout end covers include a body that is shaped to accept the lower end of a downspout elbow and include an inset door, so that the edge of the body around the door prevents damage to, or detachment of, the door. The front face of the body may be inclined rearward at an angle of approximately 50 degrees, e.g., in a range between 52.5 and 57.5 degrees, so that when the downspout end cover is attached to a standard "75 degree" elbow, which actually has a 105 degree bend, and when the elbow is mounted to a downspout aligned perpendicular to the ground, a plane of the door will be inclined at approximately 5 degrees (e.g., 2.5-7.5 degrees) perpendicular to the ground, so that any rainwater introduced from the elbow will open the door, but the door will be restored to the closed position and retained in place by the weight of the door.

Figure 1:
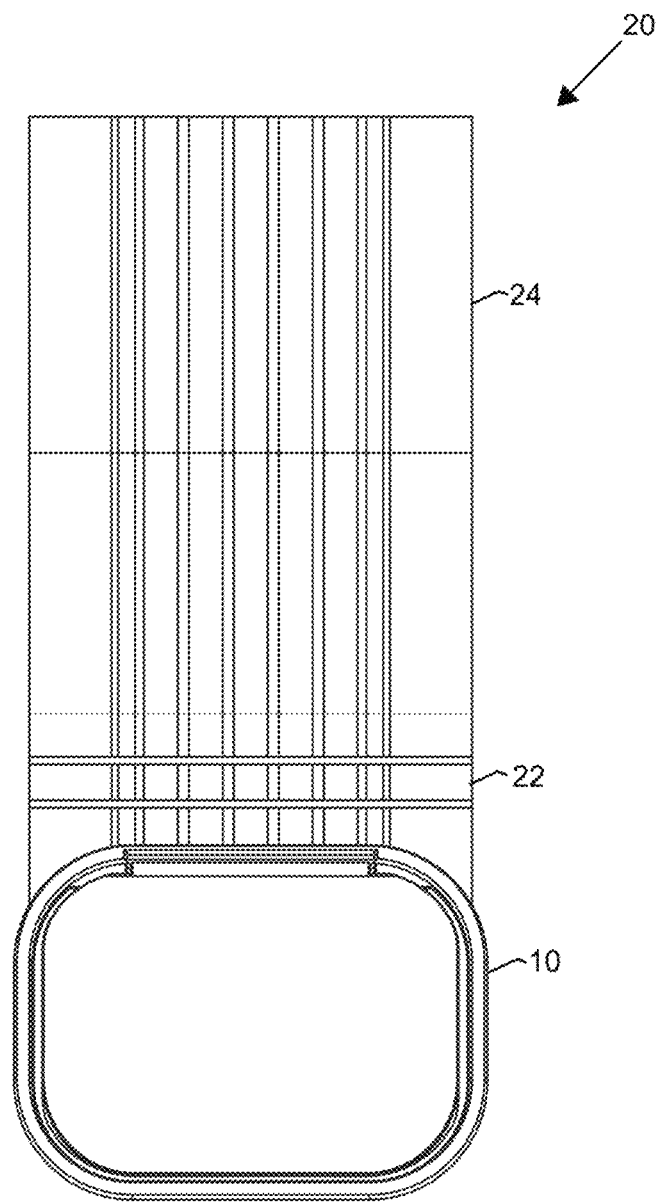
FIG. 1 is a front view showing an example downspout system 20 in accordance with an embodiment of the disclosure.

Referring now to FIG. 1, a front view of an example installation of an example downspout system 20 is shown, in accordance with an embodiment of the disclosure. Example downspout system 20 includes a downspout 24 that is attached to an elbow 22 with an end covered by downspout end cover 10, which is sized to fit the ends of elbow 22 which is a so-called "Type A" elbow and has the same cross section as downspout 24. Illustrated downspout 24 is a standard 2"×3" downspout and illustrated elbow 22 is a standard 2"×3" type-A elbow, but downspout system 20, excepting the specific aspect ratio of horizontal-to-vertical dimensions, is representative of installations of 3"×4" downspout systems, as well. Downspout end cover 20 is configured to accept a 2"×3" profile in order to fit elbow 22. For a 3"×4" profile, a different downspout end cover 20A that is configured to accept a 3"×4" profile is illustrated below with reference to FIG. 6B.

Figure 2:
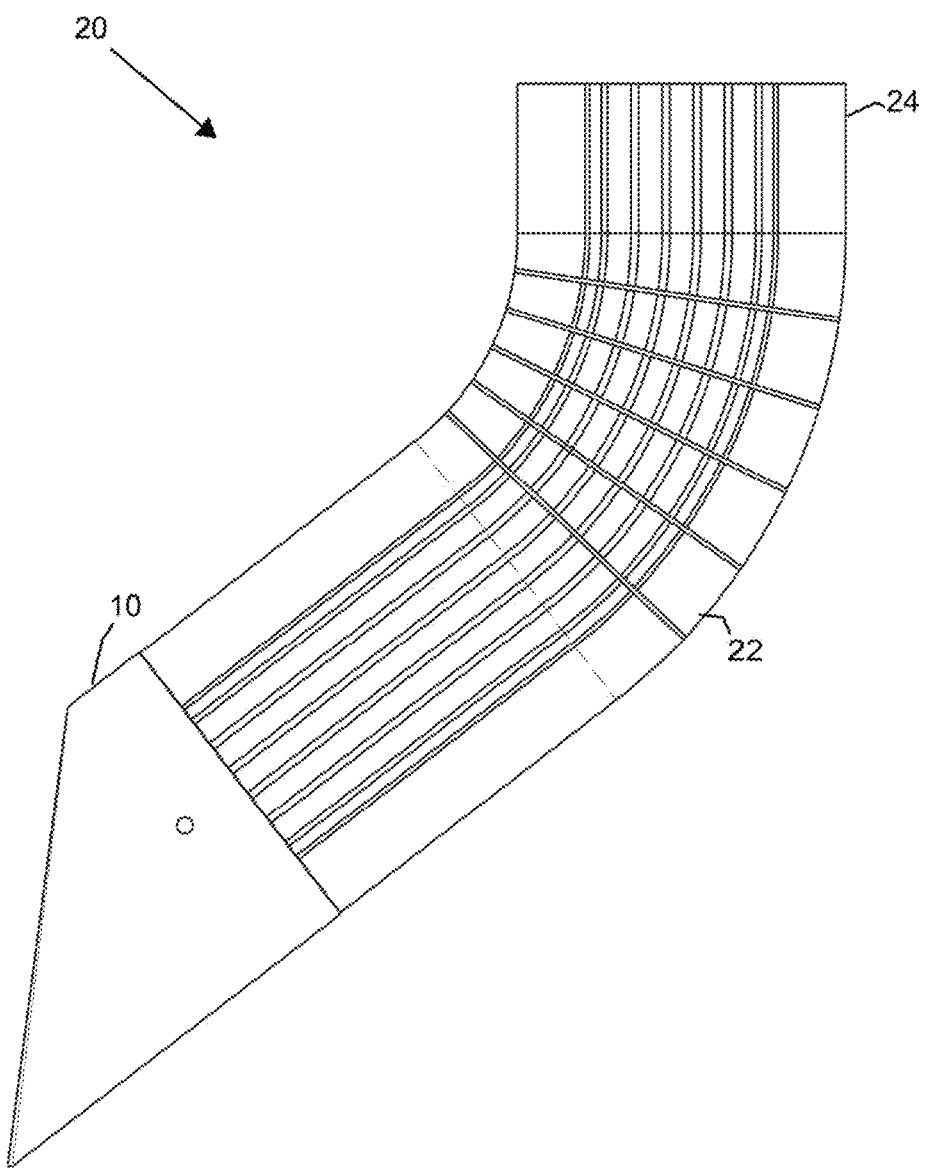
FIG. 2 is a side view of example downspout system 20 of FIG. 1.
Figure 3:
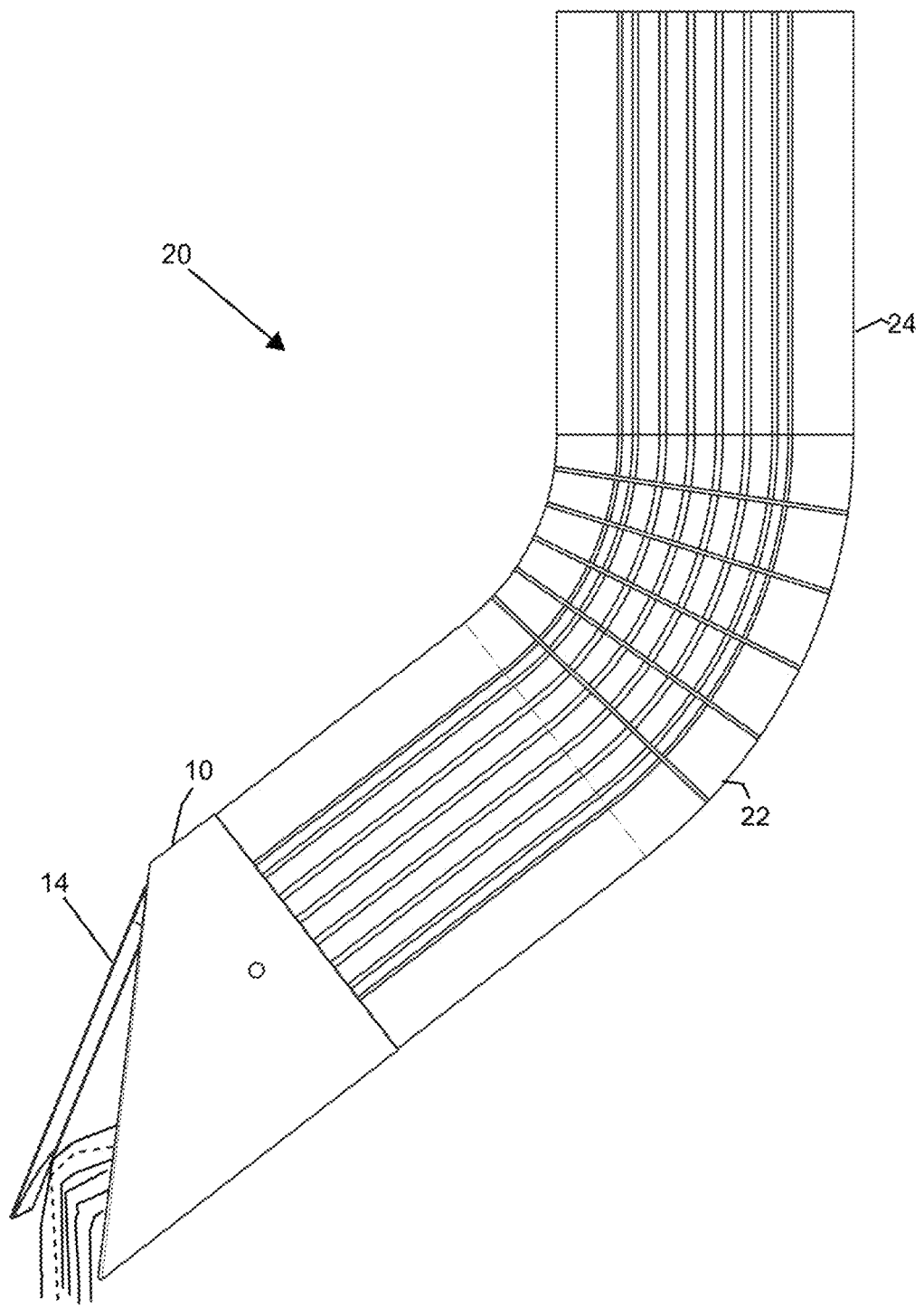
FIG. 3 is a side view of example downspout system 20 of FIG. 2, while rainwater is exiting, in accordance with an embodiment of the disclosure.

Referring now to FIG. 2, a side view of an example installation of downspout system 20 is shown, illustrating the alignment of a front face of downspout end cover 20 so that the front edge of downspout end cover 20 is aligned 5 degrees away from perpendicular to ground. FIG. 3 shows downspout end cover 10 open while emitting collected rainwater, with door 14 open to allow the water to flow out. After all of the water has been emitted, door 14 returns to a recessed position within downspout end cover 20, as illustrated in FIG. 2.

Figure 4:
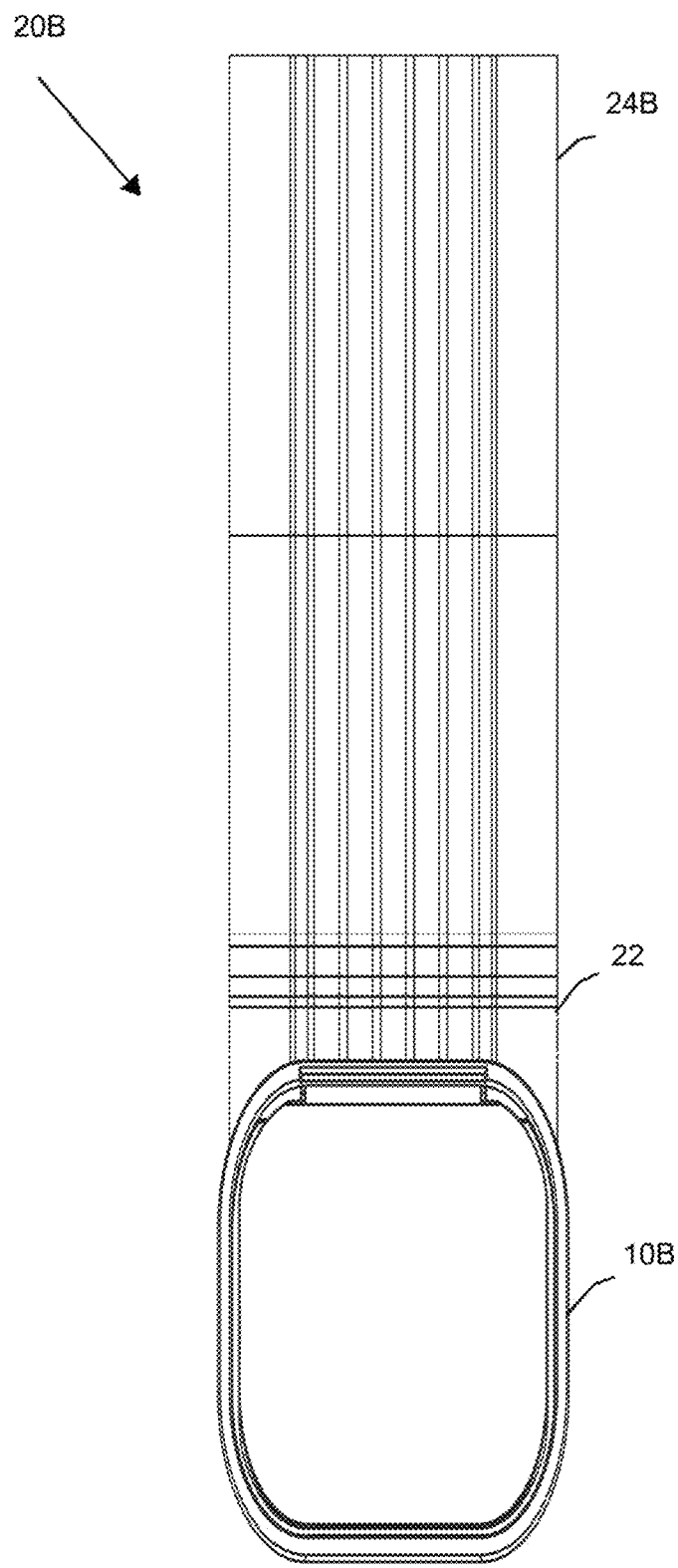
FIG. 4 is a front view of an example downspout system 20B in accordance with another embodiment of the disclosure.

Referring now to FIG. 4, a front view of another example installation of another downspout system 20B is shown, including downspout 24B that is attached to an elbow 22B, with an end covered by a downspout end cover 10B that is sized to fit the end of elbow 22B, which has the same cross section as downspout 24B. Downspout 24B has the same cross section as downspout 24 of FIG. 1, but the mounting position differs in that downspout 24B is mounted with a short side abutting the wall, so elbow 22B is a so-called "Type B" elbow that has a greater vertical dimension than horizontal dimension. Therefore, downspout end cover 10B is configured to accept a 3"×2" profile. Downspout system 22B is also illustrative of Type-B elbow installations that have a 4"×3" profile, excepting the specific aspect ratio of horizontal-to-vertical dimensions, and a downspout end cover 10C, illustrated in FIG. 9B described below, is configured for a type-B elbow installations having a 4"×3" profile.

Figure 5:
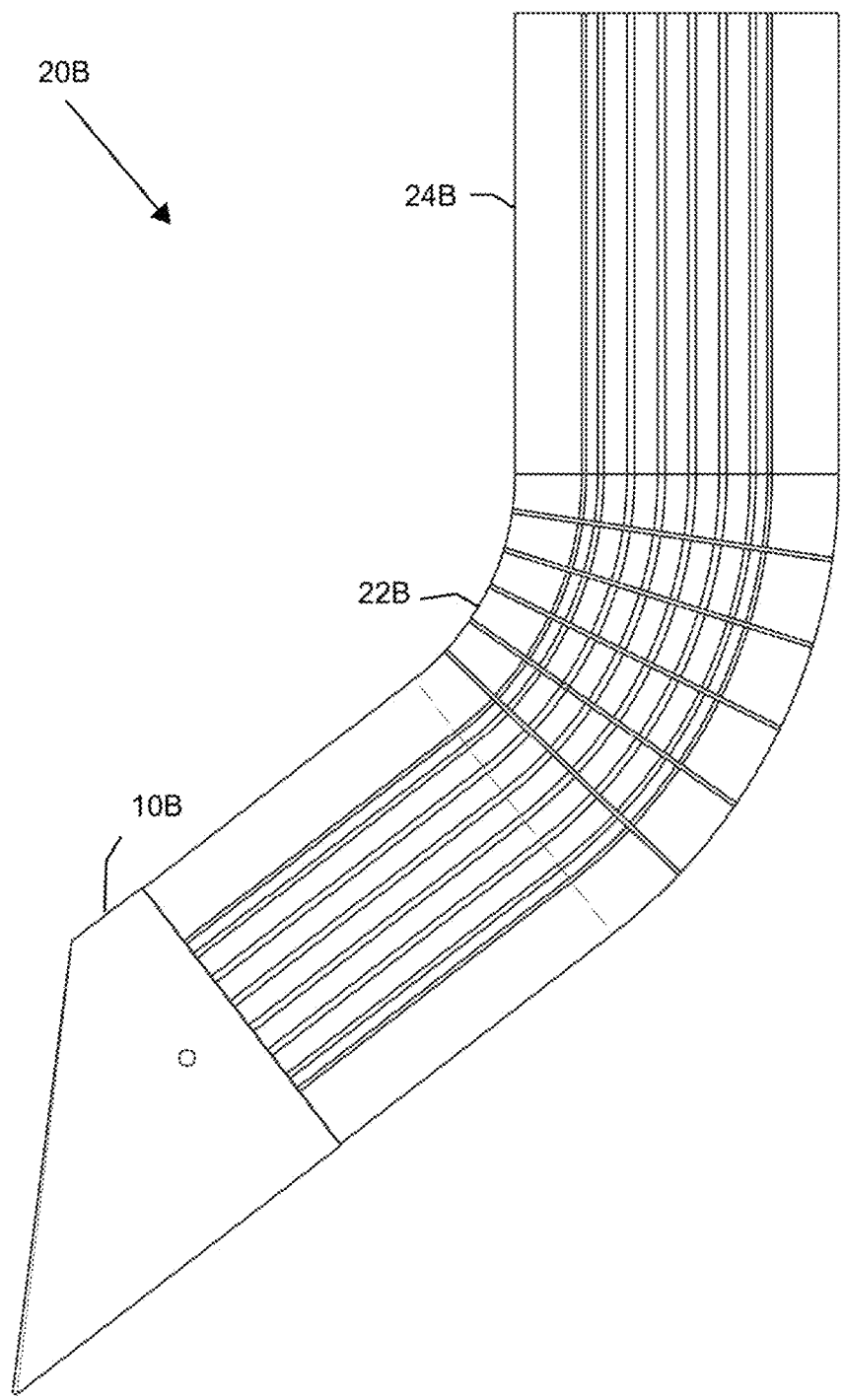
FIG. 5 is a side view of example downspout system 20B of FIG. 4.

Referring now to FIG. 5, a side view of another example installation of downspout system 20B is shown, illustrating the alignment of a front face of downspout end cover 10B so that the front edge of downspout end cover 10B is aligned 5 degrees away from perpendicular to ground.

Referring now to FIG. 6A, a perspective view of an example downspout end cover 10 is shown, in accordance with an embodiment of the disclosure. Door 14 is in the closed position and is partially recessed within a body 12 of downspout end cover 10, so that the outer edge 15 of body 12 around door 14 will protect door 14 from damage and/or detachment of door 14, when, for example, downspout end cover 10 is struck by a trimmer line. FIG. 6B shows a perspective view of other example downspout end cover 10A, in accordance with another embodiment of the disclosure, with door 14A recessed at the front of a body 12A of downspout end cover 10A. The components of downspout end cover 10 and 10A, along with other downspout end covers 10B and 10C, as disclosed and shown herein are generally injection-molded from a durable and ultraviolet (UV)-resistant plastic such as acrylic, high-density polyethylene (HDPE) or polycarbonate (PC), but may alternatively be injection-molded or cast from other plastics such as acrylonitrile butadiene styrene (ABS), or in some applications may be formed from metal or another material.

Figure 7B:
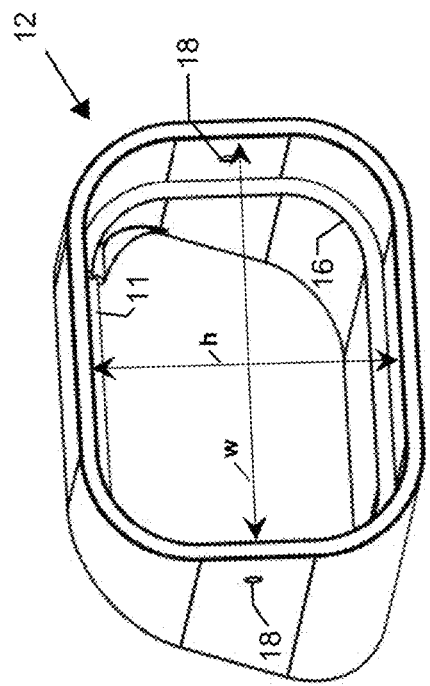
FIG. 7B is a rear lower left perspective view of a body 12 of example downspout cover 10 in accordance with an embodiment of the disclosure.
Figure 7D:
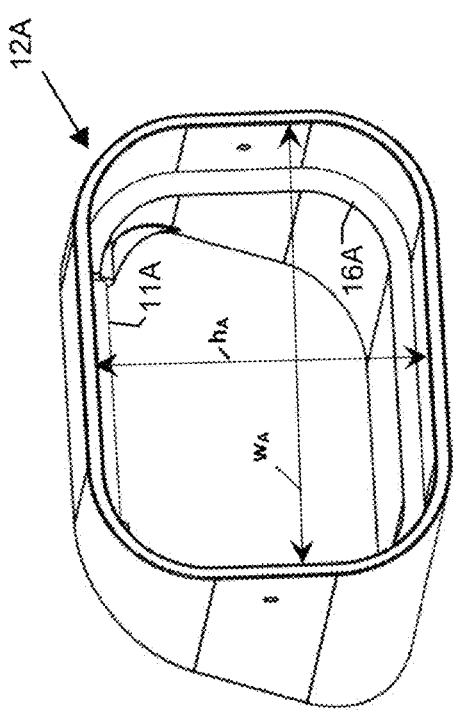
FIG. 7D is a rear left perspective view of a body 12A of example downspout cover 12A in accordance with another embodiment of the disclosure.
Figure 7A:
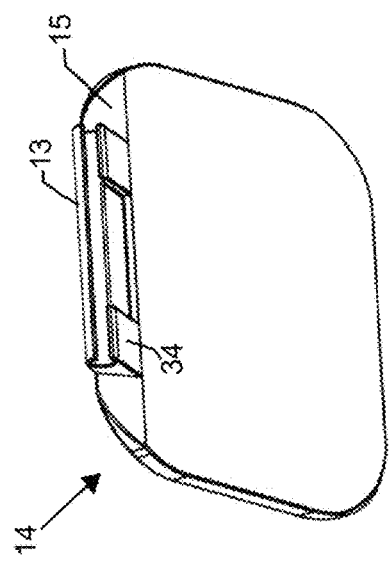
FIG. 7A is a rear lower left perspective view of an example door 14 of example downspout cover 10 in accordance with another embodiment of the disclosure.

Referring now to FIG. 7A, details of door 14 are shown. A partial cylindrical hinge knuckle 13 is formed on an extension 34 from a bevel 15 of an inner face of door 14, which shifts an axis of a hinge formed in part by knuckle 13 rearward and upward from the inner face of door 14. Referring now to FIG. 7B, details of body 12 are shown. A cylindrical axle 11 forms another part of the door hinge, around which partial cylindrical knuckle 13 is detachably fitted during assembly, to secure door 14 to body 12. A stop 16, is provided at the rearward end of an inner channel of body 12 which locates and aligns an end of a type-A elbow inserted into the back aperture of body 12, Screw holes 18 are provided for attachment of body 12 to a 2"×3" type-A elbow (or downspout section in some possible installations) by screws. As mentioned above, the height h of a back aperture of body 12A is nominally 2" and the width w is nominally 3", to accommodate the end of a 2"×3" type-A elbow.

Figure 7C:
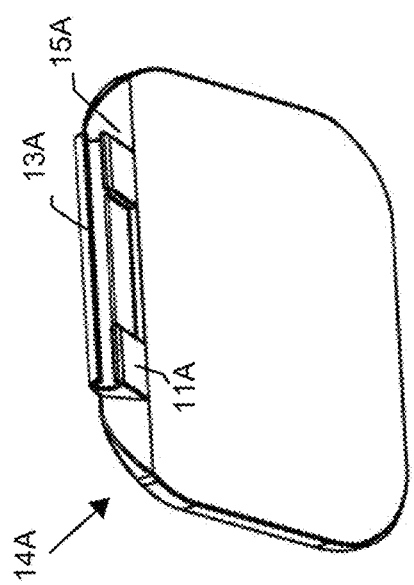
FIG. 7C is a rear left perspective view of an example door 14A of example downspout cover 10A in accordance with another embodiment of the disclosure.

Referring now to FIG. 7C and FIG. 7D, details of door 14 and body 12 are shown, respectively, in accordance with another example embodiment of the disclosure. The features of door 14A and body 12A are similar to those of door 14 and body 12 as described above with reference to FIG. 7A and FIG. 7B, so only differences between them are described below. Door 14A also has a knuckle 13A provided on an extension 34A from a bevel 15A formed on an inner face of door 14A and body 12A also has a stop 16A, which is provided at the rearward end of an inner channel of body 12A and a hinge axle 11A formed in an upper portion of body 12A behind a top of door 14A. A rear aperture of body 12A is sized to accommodate a 3"×4" type-A elbow. As mentioned above, the height $h_A$ of a back aperture of body 12 is nominally 3" and the width $w_A$ is nominally 4", to accommodate the end of a 3"×4" type-A elbow.

Figure 8A:
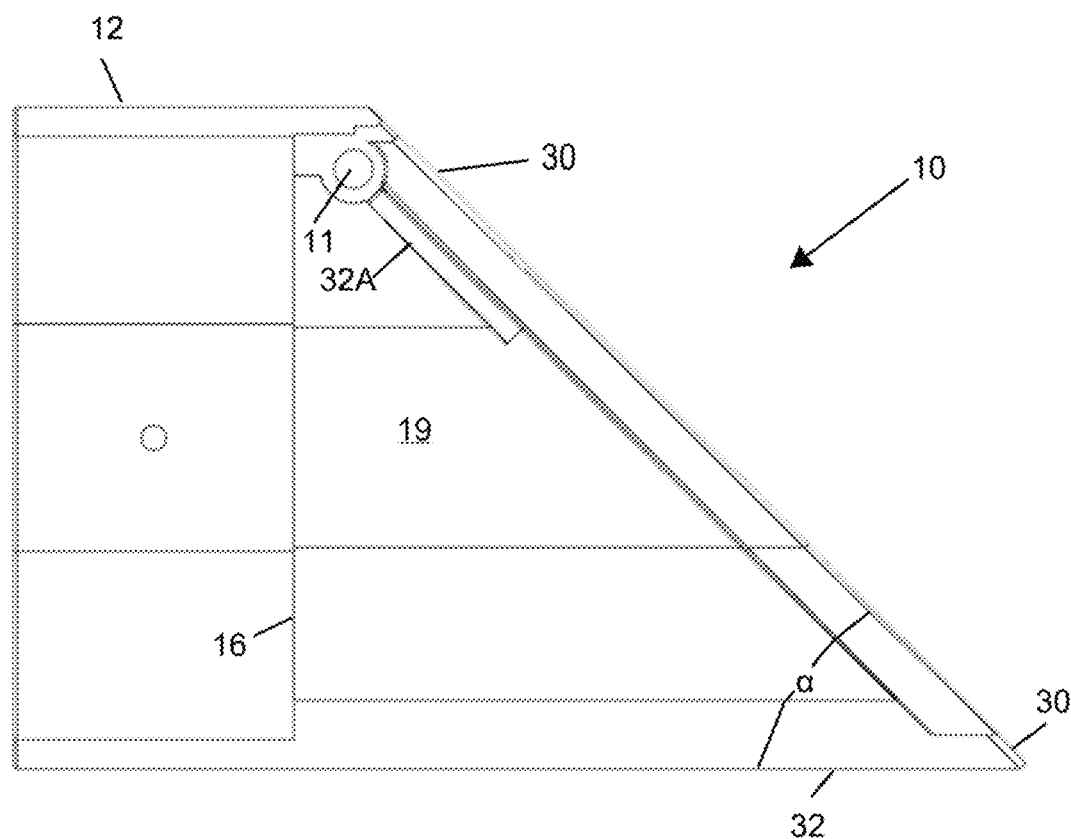
FIG. 8A is a side cross-section view of example downspout cover 10 of FIG. 6A, in accordance with an embodiment of the disclosure.

Referring now to FIG. 8A, details of example downspout cover 10 are shown in a side cross-section view, in accordance with an embodiment of the disclosure. While example downspout cover 10 is illustrated, the illustration applies similarly to the other embodiments described herein, with the appropriate changes in dimension to accommodate the different elbow/gutter sizes and orientations. As described above, edge 30 that extends completely around door 14 protects door 14 from impact by trimmer lines and other damage, because door 14 is recessed completely behind edge 15 and rests on ledge 32. The incline a of door 14 and the front of body 12 is 50 degrees in the example ($\alpha$=50 degrees), but other suitable angles sufficient to retain door behind edge 15 with gravity without posing restriction of rainwater may be used (e.g., 52.5-57.5 degrees). Stop 16 is shown at the end of a channel 19 formed between through the front aperture provided through ledge 32. The position of ledge extension 32A is also shown, as well as the position of axle 15 behind door 14.

Figure 8B:
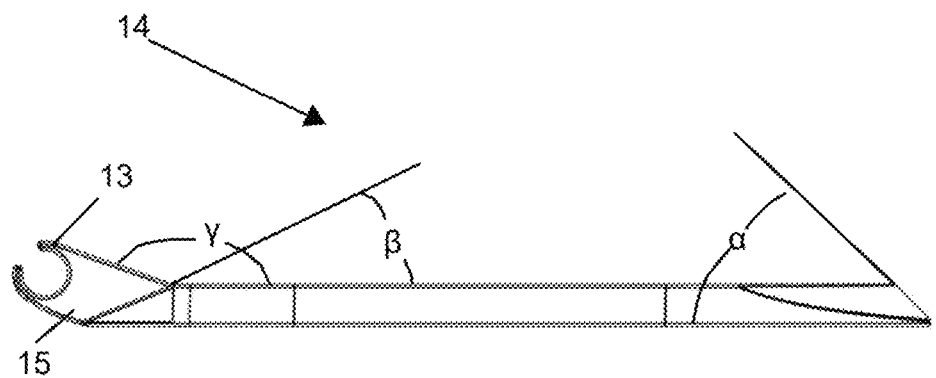
FIG. 8B is a side view of example door of example downspout cover 10 of FIG. 6A, in accordance with an embodiment of the disclosure.

Referring now to FIG. 8B, details of example door 14 are shown. The angle $\beta$ of bevel 15 is, in the example, 15 degrees with respect to the plane of the front face of door 14 and the angle 7 along extension 34 to knuckle 13 from the inner face of door 14 is 110 degrees. a beveled area 14A across the bottom of door 14 and extending partially along the sides of door 14 is inclined at angle $\alpha$, so that the bottom of door 14 does not bind against edge 30 of body 12 and provides a bottom face of door that is parallel to the inner surface of edge 30.

Figure 8C:
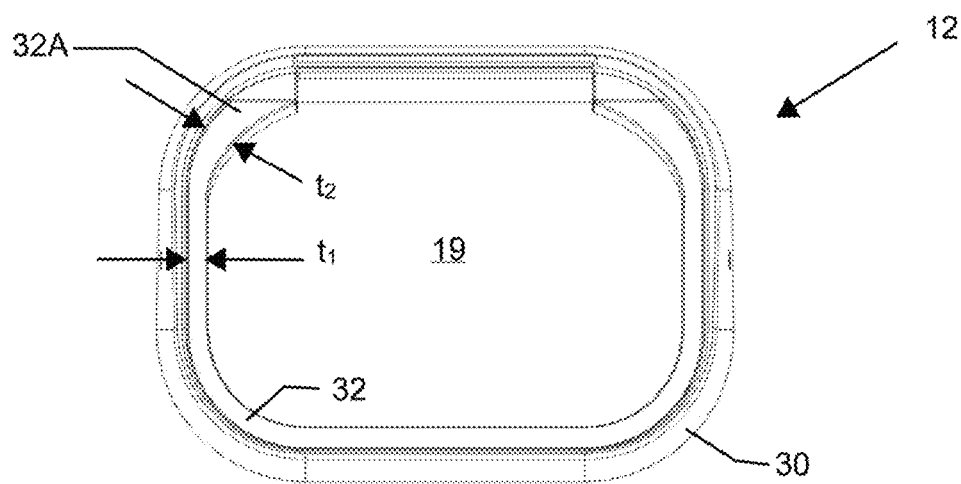
FIG. 8C is a front view of, and FIG. 8D is a right perspective view of, example body 12 of example downspout cover 10 of FIG. 6A, in accordance with an embodiment of the disclosure.
Figure 8D:
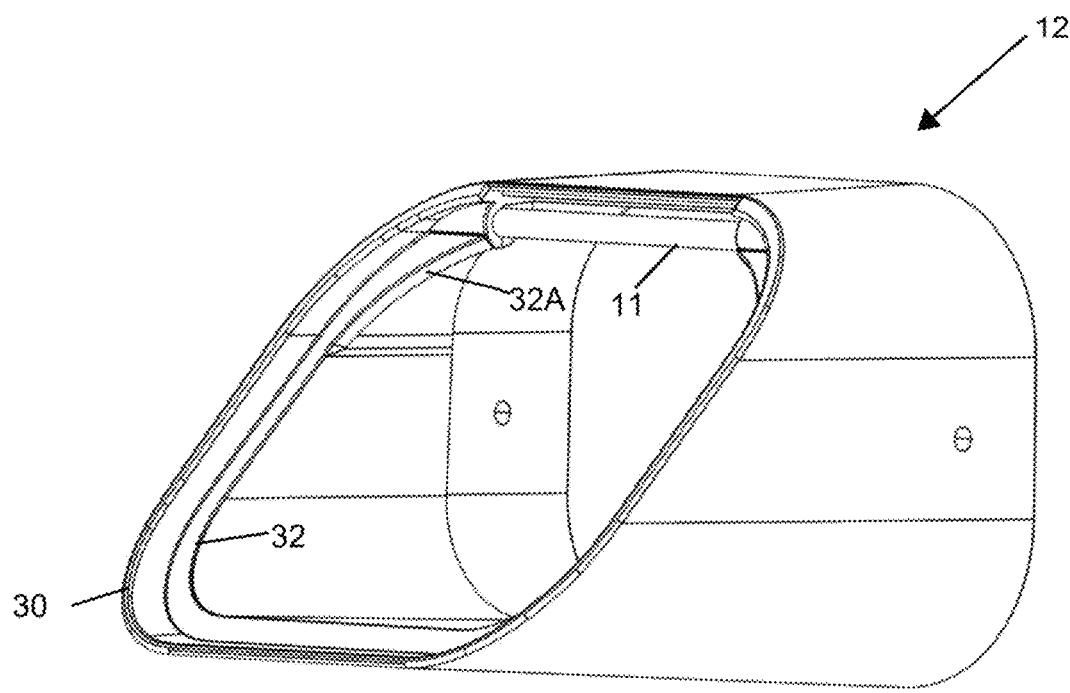

Referring now to FIG. 8C and FIG. 8D, a front view and a right perspective view of example body 12 are shown, respectively, in accordance with an embodiment of the disclosure. An extent $t_1$ of ledge 32 into channel 19 is visible, as is the increased extension $t_2$ of ledge 32A in the vicinity of the hinge, i.e., along the top portion of the inner surface of example body 12. In FIG. 8D the position of axle 11 is shown with respect to increased extension 32A.

Figure 9B:
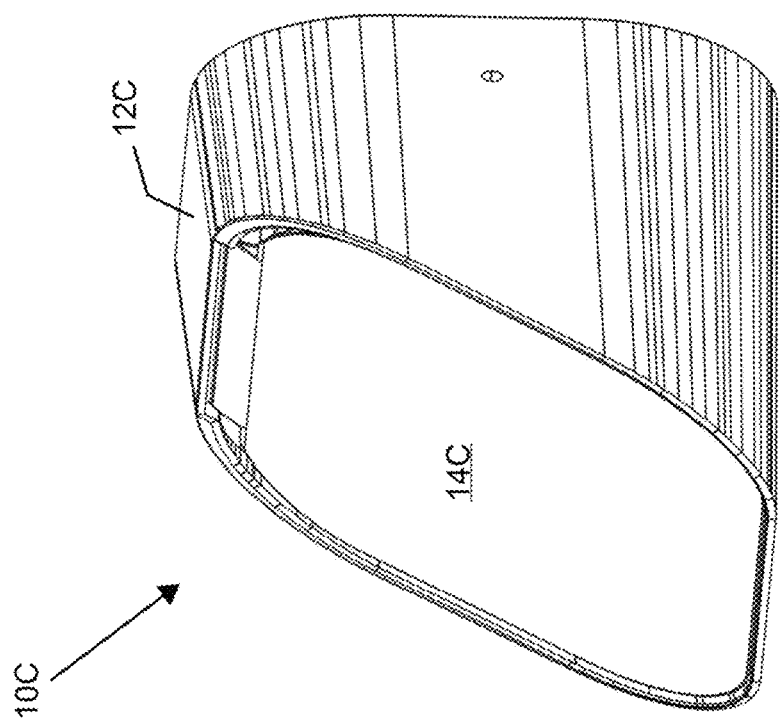
FIG. 9B is a front upper right perspective view of an example downspout cover 10C in accordance with another embodiment of the disclosure.
Figure 9A:
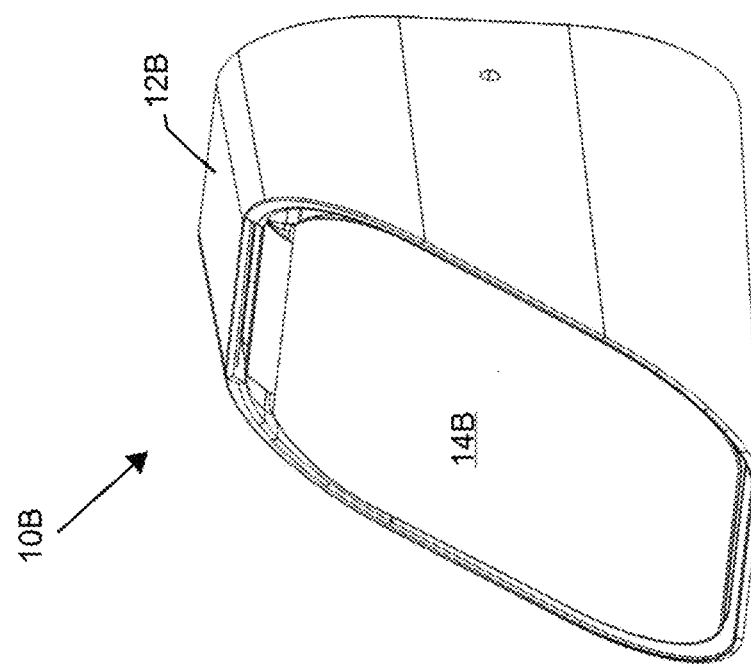
FIG. 9A is a front upper right perspective view of an example downspout cover 10B in accordance with another embodiment of the disclosure.

Referring now to FIG. 9A and FIG. 9B, a perspective views of example downspout end covers 10B and 10C are shown, in accordance with other embodiments of the disclosure. Downspout end covers 10B and 10C are similar to downspout end covers 10 and 10A of FIG. 7A and FIG. 7B, so only differences between them are described below. Downspout end covers 10B and 10C are sized to accept "Type B" elbows that have a greater vertical dimension than their horizontal dimension. Therefore, downspout end cover 10B is configured to accept a 4"×3" profile and downspout end cover 10C is configured to accept a 3"×2" profile (width $w_C$=2", height hc=3", with the larger dimension extending between a top and bottom of downspout end covers 10B, 10C, rather than between the sides of downspout end covers 10B, 10C.

Figure 10B:
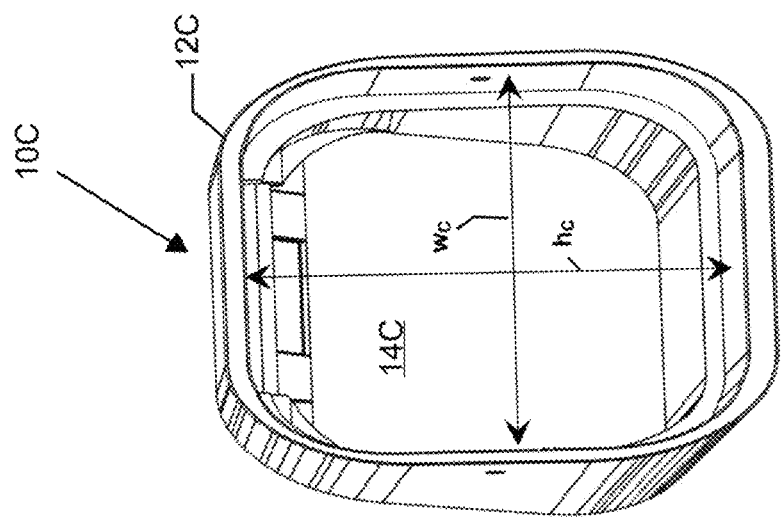
FIG. 10B is a rear left perspective view of a body of an example downspout cover 10C in accordance with another embodiment of the disclosure.
Figure 10A:
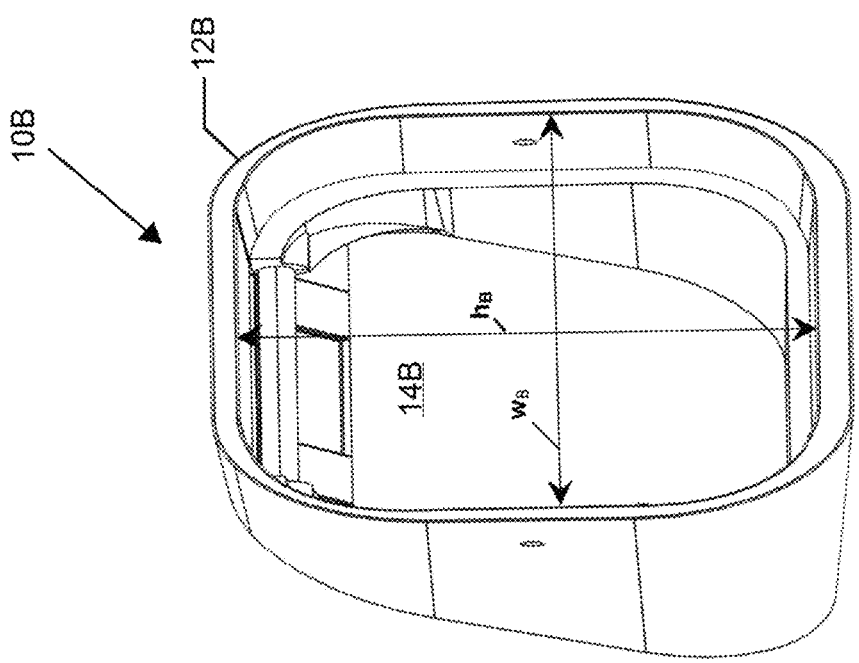
FIG. 10A is a rear left perspective view of an example downspout cover 10B in accordance with another embodiment of the disclosure.

Referring now to FIGS. 10A and 10B, details of a door 14B and body 12B of downspout end cover 10B are shown, respectively, in accordance with example embodiments of the disclosure. Referring also to FIGS. 9C and 9D, details of a door 14C and body 12C of downspout end cover 10C are shown, respectively, in accordance with example embodiments of the disclosure. The features of doors 14B, 14C and bodies 12B, 12C are similar to those of door 14A and body 12A as described above with reference to FIG. 8A and FIG. 8B, so only differences between them are described below. As mentioned above, downspout end covers 10B and 10C are sized to accept "Type B" elbows that have a greater vertical dimension than their horizontal dimension. Therefore, body 12B is configured to accept a 3"×2" profile and downspout end cover 12C is configured to accept a 4"×3" profile, with the larger dimension extending between a top and bottom of bodies 10B, 10C, rather than between the sides of bodies 10B, 10C.

In summary, this disclosure shows and describes downspout end covers, systems including the downspout end covers, and methods of assembling a downspout end cover. The downspout end covers may protecting and close a lower end of a rain gutter downspout assembly, and include a body having a top, a bottom extending parallel to the top and a pair of parallel sides, wherein the sides extend perpendicular to and are contiguous with the top and the bottom and form a continuous hollow channel with the top and the bottom for passage of collected rainwater, wherein a back of the body forms a first aperture sized to fit a cross-section profile of an end of the downspout and the front of the body forms a second aperture to permit exit of collected rainwater, a door rotatably attached to the front of the body at a top of the front of the body by a hinge, so that in a closed position, the door prevents entry of insects or blown debris and opens under a force of weight from the collected rainwater to permit exit of the collected rainwater, and an inner ledge formed on an inner surface of the body at front of the body and forming an extension into the channel in a direction parallel to the door when the doors is in the closed position, wherein the inner ledge is inset from a front edge of the second aperture by at least a thickness of the door, so that the door rests against the inner ledge when the door is in the closed position to seal the downspout end cover against entry of insects and the door is recessed within the second aperture to protect the door from being damaged or detached from the body.

In some embodiments, the front of the body of the downspout end cover may be sloped at an angle of between 52.5 and 57.5 degrees extending from the bottom to the top, so that a first width of the sides at the top of the body is less than a second width of the sides at the bottom of the body. In some embodiments, the body may have rounded corners on inner and external surfaces of the body at junctions of the sides with the top and the bottom of the body. In some embodiments an extension of the inner ledge into the channel along the rounded corners at the junctions of the sides with the top of the body may be greater than at a remainder of the extension to provide a seal against insect intrusion in the vicinity of the hinge. In some embodiments, a bottom edge of the door may be beveled so that an external face of the bottom edge of the door is parallel to the channel when the door is in the closed position, and wherein a transition from the bevel of the bottom edge to side edges of the door may be tapered and extend along the side edges of the door to release the door from binding in the rounded corners of the second aperture when the door is moved from the closed position. In some embodiments the hinge may include a cylindrical axle formed inside the channel and extending between inner surfaces of ends of the ledge along an inner surface of the top of the body, and a partial cylindrical knuckle formed on the door that detachably accepts the cylindrical axle through an open radial sector of the partial cylindrical knuckle to complete the hinge. In some embodiments, the partial cylindrical knuckle may be attached to the door by an arm that displaces the top edge door forward from the cylindrical axle, so that the hinge is recessed within the channel. In some embodiments, the arm may connect to a back surface of the door at a bevel formed in the back surface of the door, so that the arm is inclined at an obtuse angle with respect to a front surface of the door, and so that debris does not accumulate at the hinge. In some embodiments, a depth of the inner ledge may extend to form a stop for contacting the end of the downspout, so that a cross section of the channel is continuous from the stop to an external face of the inner ledge.

While the disclosure has shown and described particular embodiments of the techniques disclosed herein, it will be understood by those skilled in the art that the foregoing and other changes in form, and details may be made therein without departing from the spirit and scope of the disclosure.

For example, the techniques shown above may be applied in downspout covers that attached directly to the end of a cylindrical pipe-formed downspout.

What is claimed is:

1. A downspout end cover for protecting and closing a lower end of a rain gutter downspout assembly, the downspout end cover comprising:
    a body having a top, a bottom extending parallel to the top and a pair of parallel sides, wherein the sides extend perpendicular to and are contiguous with the top and the bottom and form a continuous hollow channel with the top and the bottom for passage of collected rainwater, wherein a back of the body forms a first aperture sized to fit a cross-section profile of an end of the downspout and the front of the body forms a second aperture to permit exit of collected rainwater;
    a door rotatably attached to the front of the body at a top of the front of the body by a hinge, so that in a closed position, the door prevents entry of insects or blown debris and opens under a force of weight from the collected rainwater to permit exit of the collected rainwater; and
    an inner ledge formed on an inner surface of the body at front of the body and forming an extension into the channel in a direction parallel to the door when the door is in the closed position, wherein the inner ledge is inset from a front edge of the second aperture by at least a thickness of the door, so that the door rests against the inner ledge when the door is in the closed position to seal the downspout end cover against entry of insects and the door is recessed within the second aperture to protect the door from being damaged or detached from the body, wherein the hinge comprises a cylindrical axle formed inside the channel and extending between inner surfaces of ends of the ledge along an inner surface of the top of the body and a partial cylindrical knuckle formed on the door that detachably accepts the cylindrical axle through an open radial sector of the partial cylindrical knuckle to complete the hinge, wherein the partial cylindrical knuckle is attached to the door by an arm that displaces the top edge door forward from the cylindrical axle, so that the hinge is recessed within the channel, and wherein the arm connects to a back surface of the door at a bevel formed in the back surface of the door, so that the arm is inclined at an obtuse angle with respect to a front surface of the door, so that debris does not accumulate at the hinge.

2. The downspout end cover of claim 1, wherein the front of the body is sloped at an angle of between 52.5 and 57.2 degrees extending from the bottom to the top, so that a first width of the sides at the top of the body is less than a second width of the sides at the bottom of the body.

3. The downspout end cover of claim 1, wherein the body has rounded corners on inner and external surfaces of the body at junctions of the sides with the top and the bottom of the body.

4. The downspout end cover of claim 3, wherein an extension of the inner ledge into the channel along the rounded corners at the junctions of the sides with the top of the body is greater than at a remainder of the extension, to provide a seal against insect intrusion in the vicinity of the hinge.

5. The downspout end cover of claim 3, wherein a bottom edge of the door is beveled so that an external face of the bottom edge of the door is parallel to the channel when the door is in the closed position, and wherein a transition from the bevel of the bottom edge to side edges of the door is tapered and extends along the side edges of the door to release the door from binding in the rounded corners of the second aperture when the door is moved from the closed position.

6. The downspout end cover of claim 1, wherein a depth of the inner ledge extends to form a stop for contacting the end of the downspout, so that a cross section of the channel is continuous from the stop to an external face of the inner ledge.

7. A downspout end cover for protecting and closing a lower end of a rain gutter downspout assembly, the downspout end cover comprising:
    a body having a top, a bottom extending parallel to the top and a pair of parallel sides, wherein the sides extend perpendicular to and are contiguous with the top and the bottom and form a continuous hollow channel with the top and the bottom for passage of collected rainwater, wherein a back of the body forms a first aperture sized to fit a cross-section profile of an end of the downspout and the front of the body forms a second aperture to permit exit of collected rainwater, wherein the front of the body is sloped at an angle of between 52.5 and 57.2 degrees extending from the bottom to the top, so that a first width of the sides at the top of the body is less than a second width of the sides at the bottom of the body, wherein the body has rounded corners on inner and external surfaces of the body at junctions of the sides with the top and the bottom of the body;
    a door rotatably attached to the front of the body at a top of the front of the body by a hinge provided by cylindrical axle formed inside the channel and extending between inner surfaces of ends of the ledge along an inner surface of the top of the body and a partial cylindrical knuckle formed on the door and that detachably accepts the cylindrical axle through an open radial sector of the partial cylindrical knuckle to complete the hinge, so that in a closed position, the door prevents entry of insects or blown debris and opens under a force of weight from the collected rainwater to permit exit of the collected rainwater, wherein the partial cylindrical knuckle is attached to the door by an arm that displaces the top edge door forward from the cylindrical axle, so that the hinge is recessed within the channel, wherein the arm connects to a back surface of the door at a bevel formed in the back surface of the door, so that the arm is inclined at an obtuse angle with respect to a front surface of the door, so that debris does not accumulate at the hinge, and wherein a bottom edge of the door is beveled so that an external face of the bottom edge of the door is parallel to the channel when the door is in the closed position, and wherein a transition from the bevel of the bottom edge to side edges of the door is tapered and extends along the side edges of the door to release the door from binding in the rounded corners of the second aperture when the door is moved from the closed position; and
    an inner ledge formed on an inner surface of the body at front of the body and forming an extension into the channel in a direction parallel to the door when the door is in the closed position, wherein the inner ledge is inset from a front edge of the second aperture by at least a thickness of the door, so that the door rests against the inner ledge when the door is in the closed position to seal the downspout end cover against entry of insects and the door is recessed within the second aperture to protect the door from being damaged or detached from the body, wherein an extension of the inner ledge into the channel along the rounded corners at the junctions of the sides with the top of the body is greater than at a remainder of the extension, to provide a seal against insect intrusion in the vicinity of the hinge, and wherein a depth of the inner ledge extends to form a stop for contacting the end of the downspout, so that a cross section of the channel is continuous from the stop to an external face of the inner ledge.

8. A method of protecting and closing a lower end of a rain gutter downspout assembly, the method comprising:

attaching a downspout end cover to the lower end of the rain gutter downspout assembly, wherein the downspout end cover is provided by a body having a top, a bottom extending parallel to the top and a pair of parallel sides, wherein the sides extend perpendicular to and are contiguous with the top and the bottom and form a continuous hollow channel with the top and the bottom for passage of collected rainwater, wherein a back of the body forms a first aperture sized to fit a cross-section profile of an end of the downspout and the front of the body forms a second aperture to permit exit of collected rainwater;

rotatably attaching a door to the front of the body of the downspout end cover at a top of the front of the body by a hinge, so that in a closed position, the door prevents entry of insects or blown debris and opens under a force of weight from the collected rainwater to permit exit of the collected rainwater;

providing an inner ledge formed on an inner surface of the body of the downspout end cover at front of the body and forming an extension into the channel in a direction parallel to the door when the door is in the closed position, wherein the inner ledge is inset from a front edge of the second aperture by at least a thickness of the door, so that the door rests against the inner ledge when the door is in the closed position to seal the downspout end cover against entry of insects and the door is recessed within the second aperture to protect the door from being damaged or detached from the body, wherein the rotatably attaching attaches a partial cylindrical knuckle formed on the door that detachably accepts a cylindrical axle through an open radial sector of the partial cylindrical knuckle to complete the hinge and providing the cylindrical axle formed inside the channel and extending between inner surfaces of ends of the ledge along an inner surface of the top of the body;

recessing the hinge within the channel by providing an arm that attaches the partial cylindrical knuckle to the door, so that the arm displaces the top edge door forward from the cylindrical axle; and preventing accumulation of debris at the hinge by providing that the arm connects to a back surface of the door at a bevel formed in the back surface of the door, so that the arm is inclined at an obtuse angle with respect to a front surface of the door.

9. The method of claim 8, wherein the front of the body of the downspout end cover is sloped at an angle of between 52.5 and 57.2 degrees extending from the bottom to the top, so that a first width of the sides at the top of the body is less than a second width of the sides at the bottom of the body, so that the attaching locates the front of the body perpendicular to ground when a downspout elbow having a 105 degree radius bend is attached between and end of a downspout and the downspout end cover.

10. The method of claim 8, wherein the body of the downspout end cover has rounded corners on inner and external surfaces of the body at junctions of the sides with the top and the bottom of the body.

11. The method of claim 10, further comprising preventing insect intrusion by providing that an extension of the inner ledge into the channel along the rounded corners at the junctions of the sides with the top of the body is greater than at a remainder of the extension, to provide a seal against insect intrusion in the vicinity of the hinge.

12. The method of claim 10, further comprising preventing binding of the door in the rounded corners of the second aperture when the door is moved from the closed position by the rotatably attaching a door having a bottom edge that is beveled so that an external face of the bottom edge of the door is parallel to the channel when the door is in the closed position, and wherein a transition from the bevel of the bottom edge to side edges of the door is tapered and extends along the side edges of the door.

13. The downspout end cover of claim 8, wherein a depth of the inner ledge extends to form a stop for contacting the end of the downspout, so that a cross section of the channel is continuous from the stop to an external face of the inner ledge.

* * * * *